United States Patent [19]
Hara et al.

[11] Patent Number: 5,521,670
[45] Date of Patent: May 28, 1996

[54] CAMERA UTILIZING HORIZONTAL AND VERTICAL BOARD CONNECTORS

[75] Inventors: Masaharu Hara, Kanagawa-ken; Jirou Asami, Tokyo; Suminori Watanabe, Saitama-ken, all of Japan

[73] Assignee: Nikon Corporation, Tokyo, Japan

[21] Appl. No.: 378,443

[22] Filed: Jan. 25, 1995

[30] Foreign Application Priority Data

Feb. 14, 1994 [JP] Japan .................................. 6-037520

[51] Int. Cl.⁶ .................................................. G03B 17/02
[52] U.S. Cl. ........................................... 354/288; 354/485
[58] Field of Search ................................... 354/288, 485

[56] References Cited

U.S. PATENT DOCUMENTS

| | | |
|---|---|---|
| 3,846,805 | 11/1974 | Kiyohara et al. . |
| 4,227,788 | 10/1980 | Shimizu et al. . |
| 4,297,018 | 10/1981 | Murakami et al. . |
| 4,306,789 | 12/1981 | Yamamoto . |
| 4,681,421 | 7/1987 | Yamada et al. . |
| 4,711,548 | 12/1987 | Arakawa et al. . |
| 4,853,734 | 8/1989 | Tokura et al. . |
| 4,926,207 | 5/1990 | Eguchi et al. . |
| 4,926,208 | 5/1990 | Teramoto et al. . |
| 5,181,065 | 1/1993 | Hara . |
| 5,253,010 | 10/1993 | Oku et al. . |

*Primary Examiner*—Monroe H. Hayes
*Attorney, Agent, or Firm*—Oliff & Berridge

[57] ABSTRACT

A carefully designed arrangement of an electrical board and an FPC board connected by electrical connectors in a camera. The reliability of electrical connections is improved, and of a higher quality. An FPC board or the like, is positioned along top side wall surfaces of a prism inside a main camera body. An electrical board, such as a rigid board or the like, is positioned along a flat surface on the main camera body that extends in an approximately horizontal direction adjacent to the side wall surface. A two-surface mount-style mounting board is positioned between the top side wall surface and the flat surface in an approximately vertical direction. A horizontal electrical connector is positioned to receive the FPC board mounted on the surface of the side wall surface side of the mounting board. A vertical electrical connector is provided to receive the electrical board surface of the flat surface side of the mounting board. The horizontal and vertical connectors are arranged in symmetrical positions on either board surface of the mounting board.

30 Claims, 2 Drawing Sheets

CAMERA UTILIZING HORIZONTAL AND VERTICAL BOARD CONNECTORS

BACKGROUND OF THE INVENTION

1. Field of the Invention

The invention relates to a single lens reflex camera or the like which is equipped with a finder optical system and a roof prism. In particular, the invention relates to a camera that ms equipped with a flexible printed circuit board (referred to hereafter as an FPC board) to which an electric circuit component mounted inside the camera is attached and electrical connectors for electrically connecting an electrical board and the like to a mounting board.

2. Description of Related Art

In recent cameras, with the shift to many functions, multiple electrical boards are generally assembled and installed, and each is electrically connected.

Conventionally, a so-called soldered bridge method that connects a conductive exposure component on both board surfaces by soldering is generally used as the electrical board connecting method.

In addition, for this type of arrangement, multiple boards are merely arranged in places which have flat surfaces maintained and extra space.

For example, suitable electrical boards are positioned in the camera along a top inclining roof surface of the roof prism, which is the prism that forms the finder optical system, or along a flat surface or the like that is approximately parallel to the top of the main camera body. Alternatively, the boards are positioned between the roof prism and the flat surface in an approximately perpendicular condition, parallel to the side surface of the roof prism.

In this type of structure, when one tries to connect the FPC board, which is the electrical board that is positioned along the roof surface of the roof prism, to the mounting board, which is the electrical board that is positioned parallel to the side surface of the roof prism, a method is employed by which one portion of the FPC board is bent, because the board surfaces of these boards are not on the same flat surface. After which both board surfaces are prepared, the above-mentioned soldering is performed, and an electrical connection is made.

Since the electrical board arranged along the flat surface that is approximately parallel to the main camera body and the mounting board that is positioned parallel to the side surface of the roof prism are approximately perpendicular, the soldered bridge is normally accomplished by a method where a bead of solder is fused to the edge where the two surfaces intersect.

However, according to the conventional structure described above, on the soldered bridge that comprises the connection between the FPC board and an electrical board such as a rigid board or the like which is not on the same flat surface as the FPC board, an elastic force is introduced by the existence of the bent portion in one part of the FPC board. Thus, a stress is continually applied to the soldered bridge at which point the bridge could conceivably break.

In addition, because the solder bead is fused to the edge where the two surfaces intersect, on the soldered bridge portion that connects the boards that are arranged perpendicular to each other, as described above, the solder bead can easily separate, causing a discontinuity. The reliability of the electrical connection at this point is unavoidably low.

Furthermore, in the conventional connecting structure described above, because the elastic force from the bent portion of the FPC board or the like is an unnecessary force, the force causes interference with the surrounding components. It is therefore desirable to devise some means of eradicating these problems.

SUMMARY OF THE INVENTION

The invention has been conceived in light of these problems, and has the object of providing a camera where the electrical connections of the FPC board which is assembled and positioned inside the camera, to the rigid board, can be easily carried out with a high degree of reliability.

In order to meet these requirements, the camera of the invention comprises an FPC board positioned inside the camera along the top side wall surface, which is an inclined surface, slanted surface, curved surface, or the like, of an outer wall surface of a structural component such as a finder prism, or of an inner wall surface of a camera exterior component; an electrical board such as a rigid board, FPC board, or the like that is positioned along the flat surface which is adjacent to the side wall surface and is formed in an approximately horizontal direction; and a two-surface mount-style mounting board that is positioned in an approximately vertical direction between the top wall side surface and flat surface inside the main camera body.

A horizontal electrical connector into which a flexible print board may be inserted and connected from a direction parallel to the board surface is positioned in a component that corresponds to the position of the FPC board on the board surface of the side wall surface side of the mounting board. A vertical electrical connector into which an electrical board is inserted and connected from a direction perpendicular to the board surface is provided in a component that corresponds to the flat surface on the board surface of the flat surface side of the mounting board.

Furthermore, with the camera of the present invention, a horizontal electrical connector and a vertical electrical connector are provided in a symmetrical position on either side of the two-sided mount-style mounting board, with the board in between.

According to the invention, when a rigid board, FPC board, and the like positioned inside the camera are electrically connected to an electrical board, since an electrical connector is used and the relative position of each board is carefully designed, the reliability of the electrical connection is improved resulting in a high quality camera.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
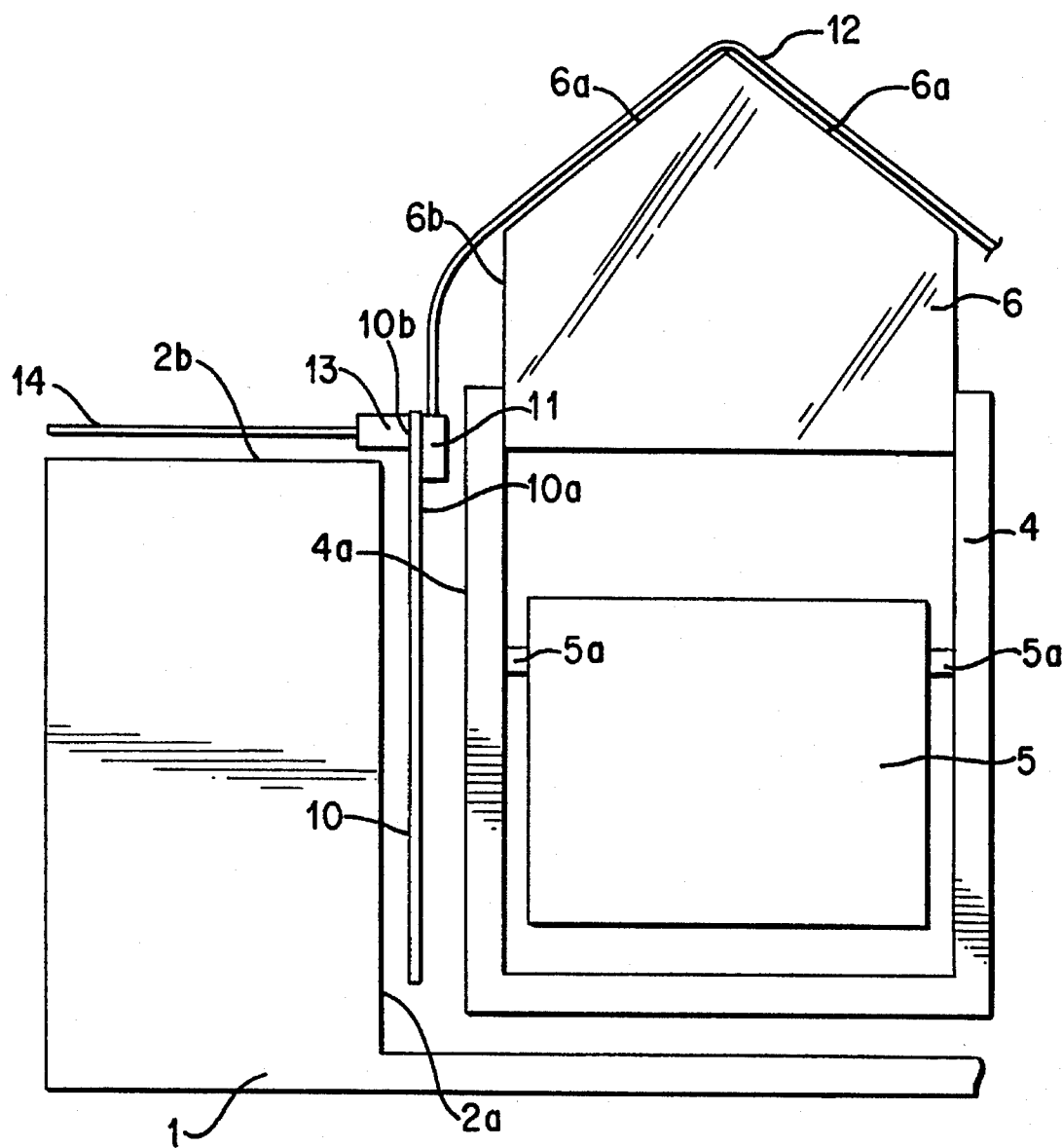
FIG. 1 is a rough, cross sectional side view that shows a camera interior partially enlarged, and which shows an embodiment of a single lens reflex camera according to the invention.
Figure 2:
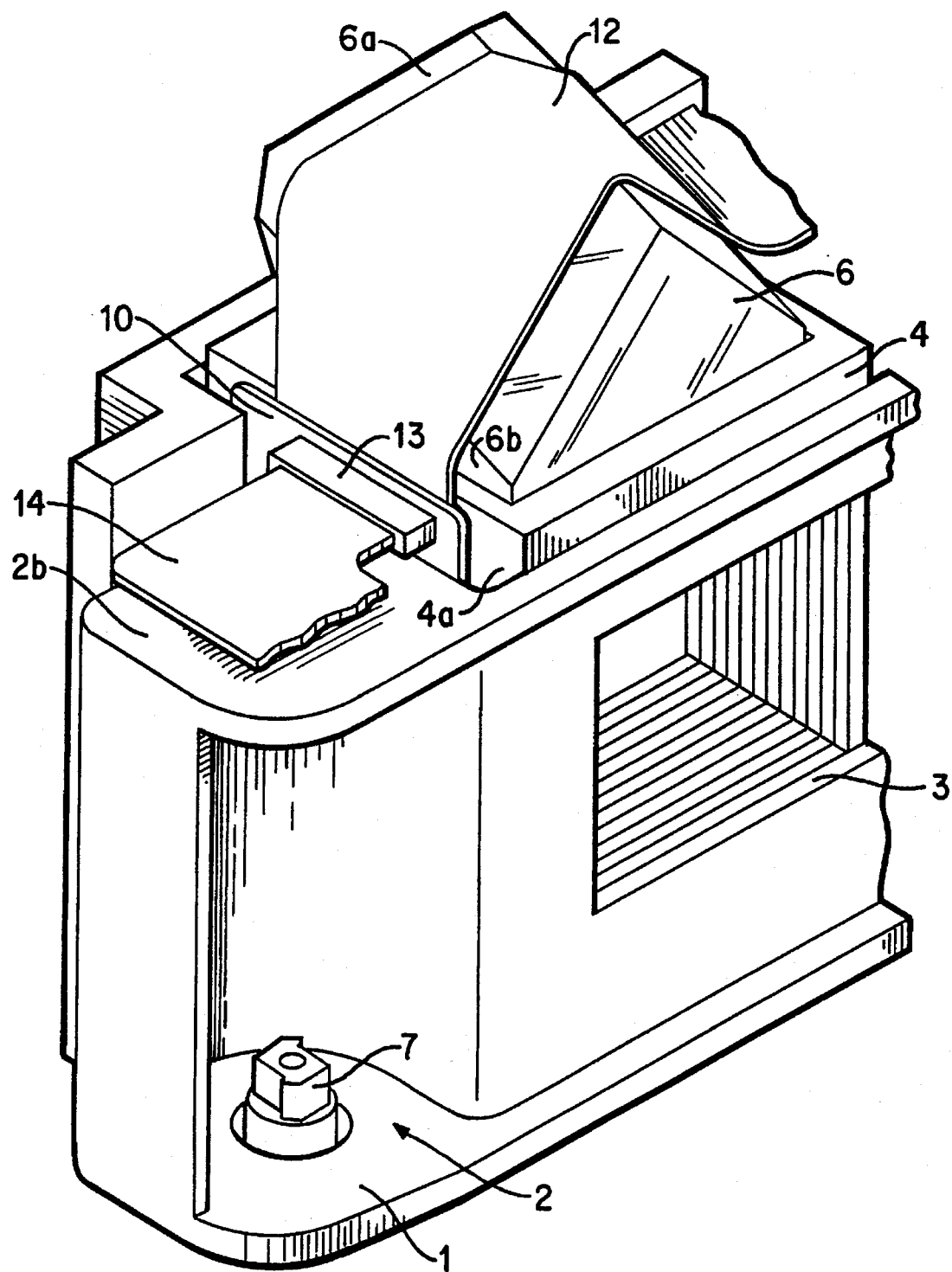
FIG. 2 is a rough oblique view of essential components, which shows an embodiment of a single lens reflex camera according to the invention.

FIGS. 1 and 2 show an embodiment of a single lens reflex camera that applies to a camera of the invention. These are rough drawings that show only essential structure.

The drawings show a main camera body, indicated as a whole by reference numeral 1, equipped with a cartridge chamber 2 which is used as the film chamber into which a film cartridge F is loaded and an aperture component 3, which is a passage through which the film runs out from, and back into, the cartridge chamber 2; a mirror box 4 which is a shrouding box installed on the front surface side of the aperture component 3 through a commonly known shutter unit (not shown), and which is constructed so as to surround the photographic light path from the photo lens (not shown) to the film. A side surface of this mirror box 4 that is on a side of the above-mentioned cartridge chamber 2 is formed as an outer wall flat surface 4a.

Also shown is a commonly known quick return mirror 5 positioned inside the mirror box 4 which has the function of conducting light from the photo lens to the finder optical system; the quick return mirror 5 is supported in the mirror box 4 by two shafts 5a affixed at the left and right ends of the mirror 5 so as to be able to rotate freely; a film rewinding fork 7 carries out film rewinding and the like by connecting with the cartridge shaft of a film cartridge (not shown) that is aligned with the above-mentioned cartridge chamber 2 and loaded into the cartridge chamber 2; a roof prism 6, which is the prism that is positioned at the top of the main camera body 1, forms a commonly known finder optical system; an FPC board 12 stretches over roof surfaces 6a which are formed at sloping angles at the top of the roof prism 6; the FPC board 12 forms an electrical circuit (not shown) by being connected to an electrical circuit component which is mounted inside the camera and which carries out various regulations; and a mounting board 10 to which is mounted controlling circuit components and the like for controlling the various electrical components within the camera.

In the invention, a two-surface, mount-style mounting board is used; this two-surface mount-style mounting board is positioned in the open space between the side flat surface 2a of the outer wall that forms the cartridge chamber 2 inside the main camera body 1 and the outer wall 4a of the mirror box 4 that faces the flat surface 2a, and is positioned parallel to the side surface 6b of the above-mentioned roof prism 6; a horizontal electrical connector 11 is connected to a component adjacent to a position that corresponds to a line extending from the top of the above mentioned roof surface 6a on top of the board surface 10a on the roof prism 6 side of the mounting board 10; one end of the above-mentioned FPC board 12 is inserted into and connected to this connector; the connecting end side of the FPC board 12 that is connected to the connector 11 is aligned in approximate parallel with the board surface 10a of the mounting board 10, and is electrically connected to the board surface 10a; a vertical electrical connector 13 is connected to the board surface 10b on the opposite side from the roof prism 6 on the mounting board 10; the connector 13 is arranged to approximately correspond to a line that extends from the top flat surface 2b, which is formed as a flat surface that is approximately horizontal on the outer wall of the cartridge chamber 2 in the main camera body 1; an electrical board 14, consisting of a rigid board or the like is positioned approximately parallel to the top flat surface 2b of the outer wall of the above-mentioned cartridge chamber; the electrical board 14 is connected to the mounting board 10 by inserting into and connecting the board 14 to the above-mentioned vertical electrical connector 13.

In other words, according to the invention, a camera comprises an FPC board 12 positioned inside the main camera body 1 along roof surfaces 6a or the like of a roof prism 6; an electrical board 14 consisting of a rigid board, that is positioned along the flat surface 2b adjacent to the side wall surface and formed so as to extend in an approximately horizontal direction; and a two-surface mount-style mounting board 10 that is positioned in an approximately vertical direction between the top wall side surface 6a and flat surface 2b inside the main camera body 1; a horizontal electrical connector 11 into which an FPC board 12 may be inserted and connected from a direction parallel to the board surface is positioned in a component that corresponds to the position of the FPC board 12 on the board surface 10a of the side wall surface side of the mounting board 10; a vertical electrical connector 13 into which an electrical board 14 is inserted and connected from a direction perpendicular to the board surface 10b provided in a component that corresponds to the flat surface 2b on the board surface 10b of the flat surface side of the mounting board 10.

According to the invention, the horizontal electrical connector 11 and vertical electrical connector 13 are symmetrically positioned on either board side 10a and 10b of the two-sided, mount-style mounting board 10, with the mounting board 10 in between.

In addition, the horizontal connector 11 is provided adjacent to a line that extends from the roof surface 6a on the board surface 10a on the prism 6 side of the mounting board 10, and an FPC board 12 is inserted and connected to this connector 11 from a direction that is parallel to the board surface 10a of the mounting board 10. Furthermore, the vertical connector 13 is provided in a position that is adjacent to a line that extends from the above-mentioned flat surface 2b on the opposite side board surface 10b, and the electrical board 14 is inserted and connected to connecter 13 from a direction that is perpendicular to board surface 10 of the mounting board 10.

According to the construction described above, connections between the mounting board 10 housed within the main camera body, the FPC board 12, and the electrical board 14 can be made according to necessary conditions by properly positioning the horizontal and vertical connectors 11 and 13 on the mounting board 10. Also, by carefully designing the relative positions of the boards 10, 12, and 14, the electrical connection components can have improved reliability, resulting in a high quality camera.

In particular, according to one embodiment, the electrical connection of the FPC board 12 positioned along the roof surface 6a of the roof prism 6 to the electrical board 14 positioned on top of the flat surface 2b of the main camera body 1 via the two-surface mount-style mounting board 10 positioned at the side of the prism 6 can be made without inconvenience.

In addition, in the embodiment described above, a horizontal electrical connector 11 is used as the connecting component for connecting the FPC board 12 to the mounting board 10. As such, the FPC board 12 can be positioned so that (1) the generation of an elastic force by the bent portion is avoided as much as possible, (2) stresses on conventional connecting components can be minimized, and (3) the occurrence of discontinuities or the like can be prevented.

The invention is not limited to the structure of the embodiments described above. It is obvious that the shape, structure, or the like, of the various camera components may be altered.

For example, in one of the embodiments described above, since the electrical board 14 is flat, a rigid board such as a glass epoxy board or the like is suitable, but this is not meant to limit the invention. An FPC board or the like may also be used as a flexible board.

In addition, in the embodiments described above, the flat surface component 2b was shown with a horizontal flat surface along which the electrical board 14 is positioned on top of the main camera body 1, but this is not meant to limit the invention; a main camera body 1 of this type need not be used. A main camera body may be used in which a flat surface component with an approximately horizontal flat surface formed for broader application inside the camera is used.

Furthermore, in the embodiments described above, a roof prism 6 (pentagonal roof prism) is used as the prism that forms the finder optical system, and in which an FPC board 12 is positioned along the top inclined roof surfaces 6a of the prism 6, but this is not meant to limit the invention. A commonly known penta prism or the like, and various other prisms that form finder optical systems may be effectively used. Also, the FPC board 12 may be positioned along outer wall surfaces which are structural components assembled and arranged inside the main camera body 1, or along side wall surfaces that form inclined surfaces, slanted surfaces or curved surfaces inside the main camera body 1.

In addition, the invention is not limited to a single lens reflex camera of the embodiments described above. The above described FPC board assembly can be effective on various cameras.

As described above, according to embodiments of the camera of the invention, the camera comprises an FPC board positioned inside the camera along the top side wall surface, which is an inclined surface, slanted surface, curved surface, or the like, of an outer wall surface of a structural component such as a finder prism, or of an inner wall surface of a camera exterior component; an electrical board such as a rigid board, FPC board, or the like that is positioned along the flat surface which is adjacent to the side wall surface and is formed in an approximately horizontal direction when the camera is held in a normal operating position; a two-surface mount-style mounting board that is positioned in an approximately vertical direction, when the camera is held in a normal operating position, between the top wall side surface and flat surface inside the main camera body; a horizontal electrical connector into which a flexible print board may be inserted and connected from a direction parallel to the board surface, which has an opening parallel to the two surface mounting board, that corresponds to the position of the FPC board on the board surface of the side wall surface side of the mounting board; and a vertical electrical connector into which an electrical board is inserted and connected from a direction perpendicular to the board surface provided in a component, which has an opening transverse to the two-surface mounting board, that corresponds to the flat surface on the board surface of the flat surface side of the mounting board. The following superior effects are obtained from the embodiment of the invention described above, in spite of the simple construction of the camera.

Namely, since the electrical connection of the electrical board, two-surface mounting board, and FPC board which are assembled and arranged inside the main camera body is accomplished using electrical connectors, the electrical connection can be reliably and safely maintained even if an elastic force from the bent portion of the FPC board is applied as a stress to the connecting components.

In addition, because the two boards of which the electrical board surfaces intersect can also be connected using electrical connectors, the inconveniences that arise when using a conventional soldered bridge are eliminated. A reliable camera may thus be obtained.

In particular with the invention, by carefully designing the relative positions of the horizontal and vertical electrical connectors in symmetrical positions on either surface of two-surface mount-style mounting board, connecting operations to the mounting board can be simplified, the strength of the board may be maintained, the electrical connections are highly reliable, resulting in a high quality camera.

Although this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera comprising:
   a flexible printed circuit board positioned along a top side wall surface of a main camera body;
   an electrical board positioned along a first flat surface adjacent to said side wall surface and formed in an approximately horizontal direction with respect to a normal operating position of a camera;
   a two-surface mount-style mounting board that is positioned in an approximately vertical direction with respect to a normal operating position of a camera between the top wall side surface and a second flat surface inside said main camera body;
   a horizontal electrical connector provided with an opening mounted on a surface of the mounting board opposing the side wall surface, into which a flexible printed circuit board may be inserted and connected from a direction parallel to the board surface; and
   a vertical electrical connector provided with an opening mounted on a surface of the mounting board opposing the second flat surface side, into which said electrical board is inserted and connected from a direction perpendicular to the board surface.

2. A camera according to claim 1, wherein the top side wall surface of the main camera body is an outer wall surface of a structural component assembled inside the main camera body.

3. A camera according to claim 2, wherein the top side wall surface of the main camera body is an inclined surface.

4. A camera according to claim 2, wherein the top side wall surface of the main camera body is a slanted surface.

5. A camera according to claim 2, wherein the top side wall surface of the main camera body is a curved surface.

6. A camera according to claim 2, wherein the electrical board is a rigid board.

7. A camera according to claim 6, wherein said prism is a roof prism, said flexible printed circuit board is positioned along a top roof surface of the roof prism, and said two-sided mount-style mounting board is positioned approximately parallel to a side surface of the roof prism.

8. A camera according to claim 2, wherein the electrical board is a flexible printed circuit board.

9. A camera according to claim 8, wherein said prism is a roof prism, said flexible printed circuit board is positioned along a top roof surface of the roof prism, and said two-sided mount-style mounting board is positioned approximately parallel to a side surface of the roof prism.

10. A camera according to claim 1, wherein the top side wall surface of the main camera body is an inner wall surface of an external component of the main camera body.

11. A camera according to claim 3, wherein the top side wall surface of the main camera body is an inclined surface.

12. A camera according to claim 3, wherein the top side wall surface of the main camera body is a slanted surface.

13. A camera according to claim 3, wherein the top side wall surface of the main camera body is a curved surface.

14. A camera according to claim 10, wherein the electrical board is a flexible printed circuit board.

15. A camera according to claim 14, wherein said prism is a roof prism, said flexible printed circuit board is positioned along a top roof surface of the roof prism, and said two-sided mount-style mounting board is positioned approximately parallel to a side surface of the roof prism.

16. A camera according to claim 10, wherein the electrical board is a rigid board.

17. A camera according to claim 16, wherein said prism is a roof prism, said flexible printed circuit board is positioned along a top roof surface of the roof prism, and said two-sided mount-style mounting board is positioned approximately parallel to a side surface of the roof prism.

18. A camera according to claim 1, wherein the top side wall surface of the main camera body is an inclined surface.

19. A camera according to claim 1, wherein the top side wall surface of the main camera body is a slanted surface.

20. A camera according to claim 1, wherein the top side wall surface of the main camera body is a curved surface.

21. A camera according to claim 1, wherein said horizontal electrical connector and said vertical electrical connector are symmetrically positioned on either side of the two-surface mount-style mounting board, with the mounting board in between.

22. A camera according to claim 21, wherein said prism is a roof prism, and said two-sided mount-style mounting board is positioned approximately parallel to a side surface of the roof prism.

23. A camera according to claim 1, wherein the electrical board is a rigid board.

24. A camera according to claim 23, wherein said prism is a roof prism, said flexible printed circuit board is positioned along a top roof surface of the roof prism, and said two-sided mount-style mounting board positioned approximately parallel to a side surface of the roof prism.

25. A camera according to claim 1, wherein the electrical board is a flexible printed circuit board.

26. A camera according to claim 25, wherein said prism is a roof prism, said flexible printed circuit board is positioned along a top roof surface of the roof prism, and said two-sided mount-style mounting board positioned approximately parallel to a side surface of the roof prism.

27. A camera comprising:

a prism positioned at a top of a main camera body and which forms an optical system of a finder;

a flat surface with an approximately horizontal surface on the top of said main camera body;

a two-surface mount-style mounting board positioned approximately parallel to a side surface of the prism between the prism and the flat surface;

a flexible printed circuit board positioned along a top inclined surface of said prism; and an electrical board positioned along said flat surface, wherein, on said mounting board, are provided;

a horizontal electrical connector provided with a portion adjacent to a line that extends from a top of said flat surface on top of a prism side of the mounting board, and into which said flexible printed circuit board is inserted and connected from a direction parallel to the board surface of said mounting board; and a vertical electrical connector provided with a portion adjacent to a line that extends from a top of said flat surface on top of an opposite side of the mounting board surface, and into which said flexible printed circuit board is inserted and connected from a direction perpendicular to the board surface of the mounting board.

28. A camera according to claim 27, wherein said horizontal electrical connector and said vertical electrical connector are symmetrically positioned on either side of the two-surface mount-style mounting board, with the mounting board in between.

29. A camera according to claim 28, wherein said prism is a roof prism, and said two-sided mount-style mounting board is positioned approximately parallel to a side surface of the roof prism.

30. A camera according to claim 27, wherein said prism is a roof prism, a flexible printed circuit board is positioned along a top roof surface of the roof prism, and a two-sided mount-style mounting board is positioned approximately parallel to a side surface of the roof prism.

* * * * *